US012596739B2

(12) United States Patent
Dhaliwal et al.

(10) Patent No.: US 12,596,739 B2
(45) Date of Patent: Apr. 7, 2026

(54) POST-WORK SUMMARY GENERATION, REFINEMENT, AND UPDATE FOR FIELD SERVICE CALLS

(71) Applicant: Salesforce, Inc., San Francisco, CA (US)

(72) Inventors: Puneet Dhaliwal, Dublin, CA (US); Shreyaa Sridhar, Belmont, CA (US); Nafeez Salma Chittoor Khader, Fremont, CA (US); Rajan Shah, Yardley, PA (US); Niv Garber, Degania Bet (IL); William Carpenter, Brooklyn, NY (US); Sindhusree Aita, Sunnyvale, CA (US); Man Kit Yau, Burnaby (CA)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/830,472

(22) Filed: Sep. 10, 2024

(65) Prior Publication Data

US 2026/0072972 A1 Mar. 12, 2026

(51) Int. Cl.
| | |
|---|---|
| *G06F 16/34* | (2025.01) |
| *G06F 16/334* | (2025.01) |

(Continued)

(52) U.S. Cl.
CPC ........ *G06F 16/345* (2019.01); *G06F 16/3344* (2019.01); *G06F 16/338* (2019.01); *G06F 40/186* (2020.01); *G06F 40/40* (2020.01)

(58) Field of Classification Search
CPC ... G06F 16/345; G06F 16/338; G06F 16/3344
See application file for complete search history.

(56) References Cited

U.S. PATENT DOCUMENTS

| | | | | |
|---|---|---|---|---|
| 2010/0251247 A1* | 9/2010 | Pedersen | ............... | G06Q 10/06 |
| | | | | 718/102 |
| 2015/0120359 A1* | 4/2015 | Dongieux | ............ | G06F 16/285 |
| | | | | 705/7.15 |

(Continued)

*Primary Examiner* — Van H Oberly
(74) *Attorney, Agent, or Firm* — Sterne, Kessler, Goldstein & Fox P.L.L.C.

(57) ABSTRACT

Disclosed herein are system, method, and computer program product aspects for textual post-work summary generation, refinement, and/or update. An example implementation operates by generating a first natural-language textual prompt based on a textual transcription of a first speech of a user and a first prompt template selected based on a work order. The implementation then queries a LLM with the first natural-language textual prompt to generate a textual post-work summary. The implementation then generates a second natural-language textual prompt based on a textual transcription of a second speech of the user and a second prompt template. The implementation then queries the LLM with the second natural-language textual prompt that directs the LLM to refine the textual post-work summary. In addition, the implementation updates the work order based on the refined textual post-work summary. In some aspects, the implementation may generate an updated textual post-work summary based on incorporating a textual transcription of a third speech of the user into the generated and/or the refined textual post-work summary, and then update the work order based on the updated textual post-work summary.

20 Claims, 10 Drawing Sheets

Text Summarization System
100

(51) Int. Cl.
    *G06F 16/338*       (2019.01)
    *G06F 40/186*       (2020.01)
    *G06F 40/40*        (2020.01)

(56)           References Cited

U.S. PATENT DOCUMENTS

2021/0365855 A1*  11/2021  Doan ............... G06Q 10/06311
2025/0094821 A1*   3/2025  Hettige ................ G06N 3/0475
2025/0139413 A1*   5/2025  Cao ....................... G06N 3/0475

* cited by examiner

400

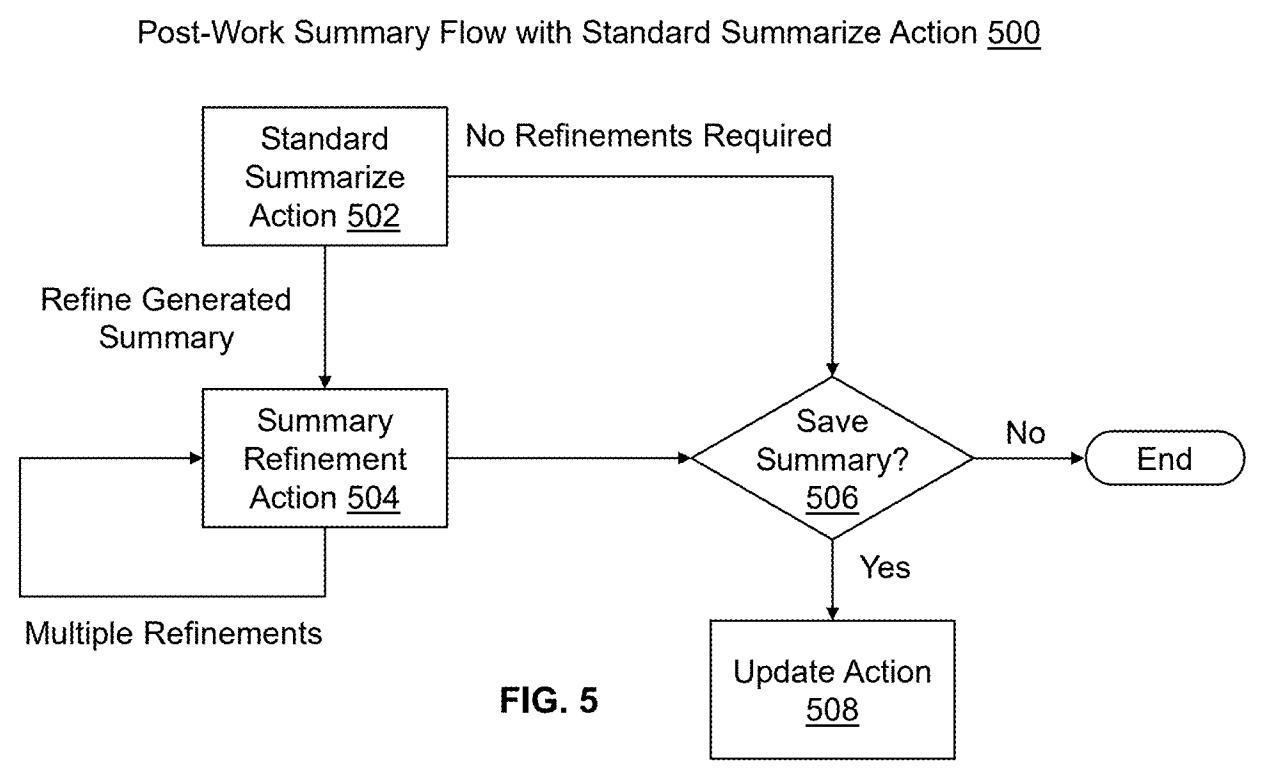

Post-Work Summary Flow with Standard Summarize Action 500

Standard Summarize Action 502

No Refinements Required

Refine Generated Summary

Summary Refinement Action 504

Multiple Refinements

Save Summary? 506

No → End

Yes

Update Action 508

FIG. 5

Post-Work Summary Flow without Standard Summarize Action 600

Post-Work Summary Flow with Follow Up Action 700

FIG. 7

Post-Work Summary Flow with Chaining Update Action 800

FIG. 8

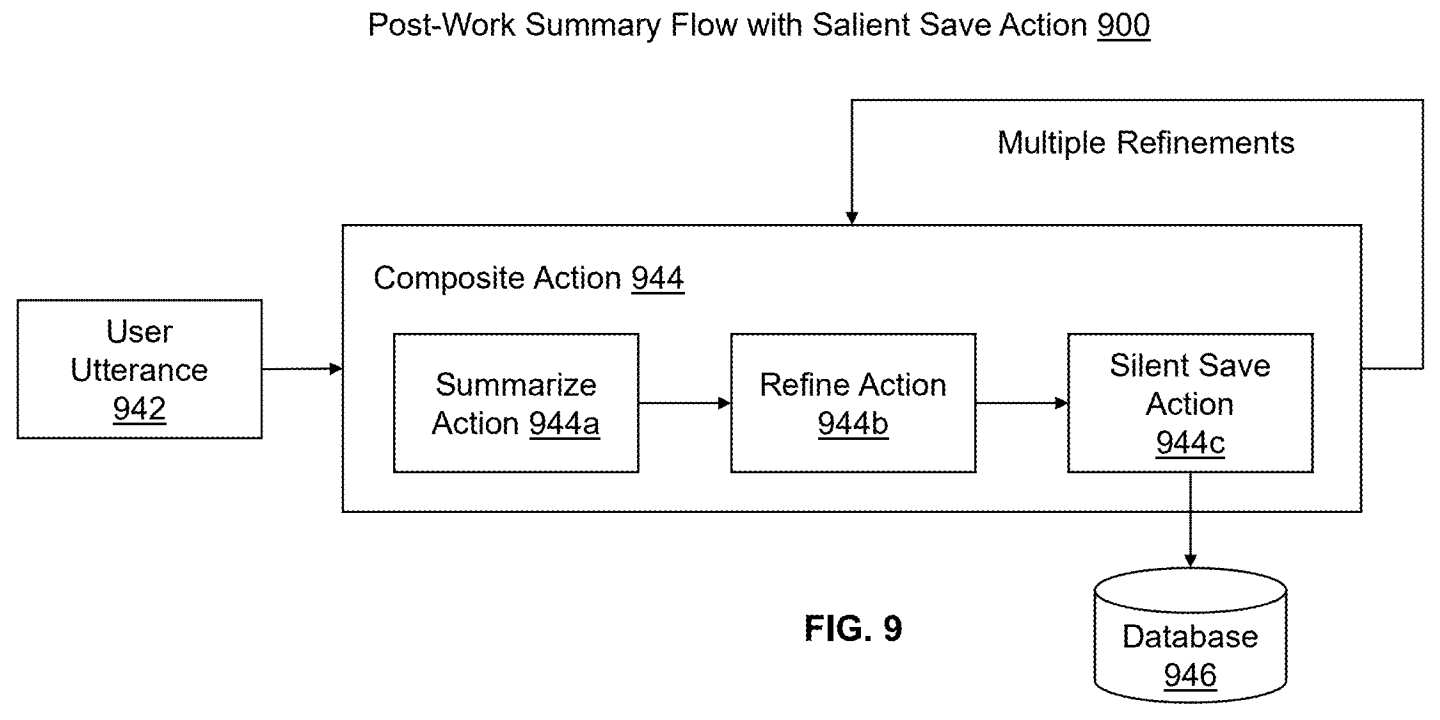

Post-Work Summary Flow with Salient Save Action 900

Multiple Refinements

Composite Action 944

User
Utterance
942

Summarize
Action 944a

Refine Action
944b

Silent Save
Action
944c

Database
946

FIG. 9

POST-WORK SUMMARY GENERATION, REFINEMENT, AND UPDATE FOR FIELD SERVICE CALLS

BACKGROUND

A Large Language Model (LLM) is a machine learning model that can comprehend and generate human language text and other generative outputs based on a large data training set. LLMs are becoming integrated into a wide variety of fields, such as research, agent response, healthcare, translation, content creation, and a wide array of business applications.

In order to cause a LLM to produce responsive action, such as summarizing a work order that has been completed by a technician, it is often necessary to write a prompt to steer the LLM to perform this summarization. This prompt is essentially an instruction to the LLM. Different LLMs may use different prompts, and one prompt may not necessarily be interchangeable with another.

This disclosure is generally directed to a text summarization system, and more particularly to a LLM-enabled text summarization system for textual post-work summary generation, refinement, and/or update.

BRIEF DESCRIPTION OF THE FIGURES

The accompanying drawings are incorporated herein and form a part of the specification.

FIG. 5 is a post-work summary flow with standard summarize action, according to aspects of the present disclosure.

FIG. 7 is a post-work summary flow with follow up action, according to aspects of the present disclosure.

FIG. 8 is a post-work summary flow with update action chaining, according to aspects of the present disclosure.

FIG. 9 is a post-work summary flow with salient save action, according to aspects of the present disclosure.

In the drawings, like reference numbers generally indicate identical or similar elements. Additionally, generally, the left-most digit(s) of a reference number identifies the drawing in which the reference number first appears.

DETAILED DESCRIPTION

Figure 1:
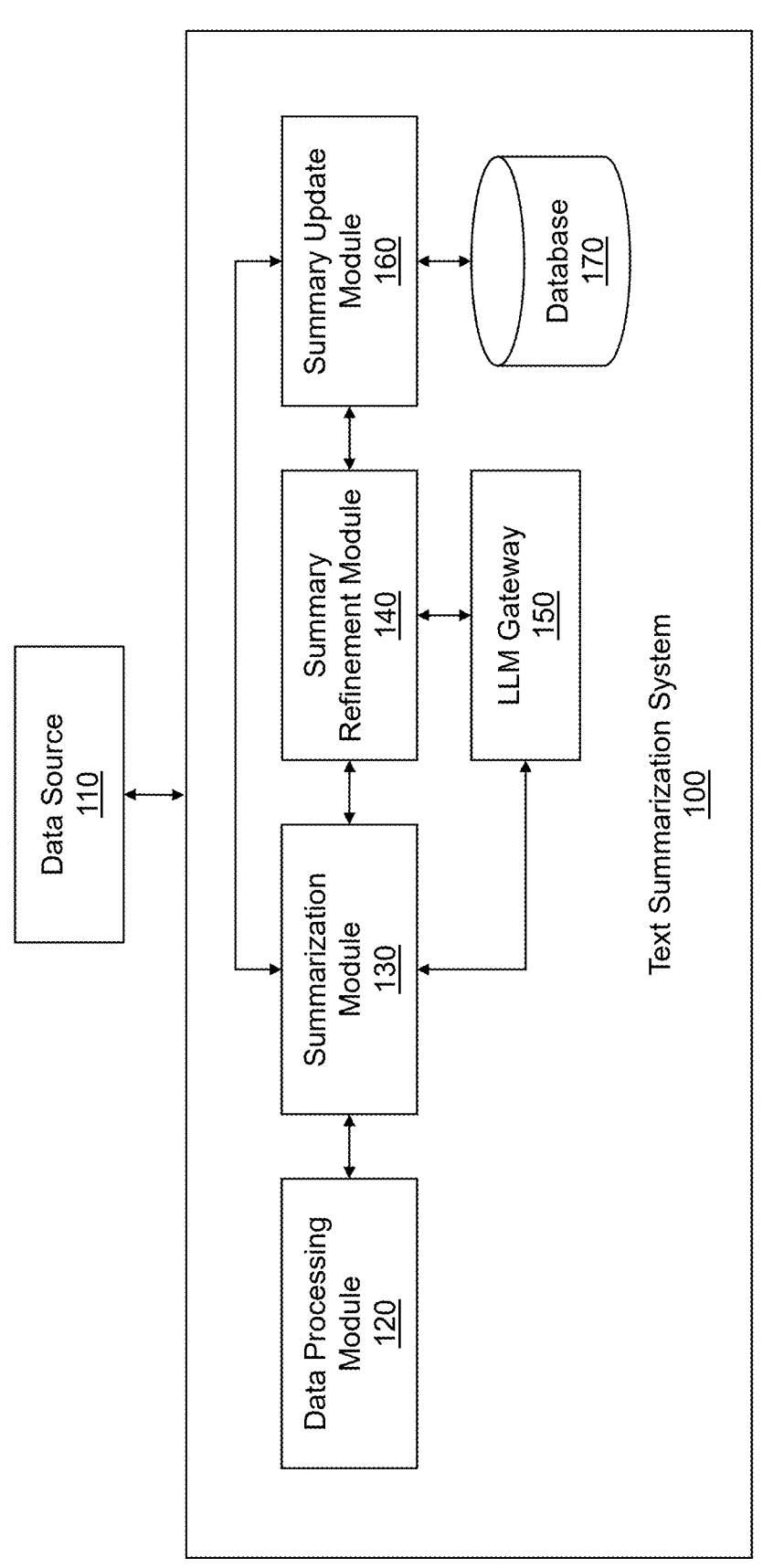
FIG. 1 is a block diagram of a text summarization system, according to aspects of the present disclosure.

Provided herein are system, apparatus, device, method and/or computer program product aspects, and/or combinations and sub-combinations thereof, for textual post-work summary generation, refinement, and/or update Implementations described herein may summarize a work order for a user based on a user utterance in a text summarization system. The user utterance may refer to any input provided by the user including the form of text or voice. The user utterance can range from simple one-word commands to more complex sentences, paragraphs, and/or questions. In some aspects, the text summarization system may refine the generated summary by providing a refinement instruction either as part of the same user utterance or as different one in the conversation. The refinement instruction may refer to, instead of a generic request to refine the summary, explicit questions and/or topics the user may want the refinement of summary to include. The refined summary output may be a comprehensive summary that addresses the specified queries, offering a more tailored and insightful result. In some aspects, the text summarization system may obtain confirmation from the user to update the work order record based on the generated and/or the refined summary. For example, the text summarization system may display a message to end user to request the user input for confirmation before executing further actions. The text summarization system may allow the user to make one or more edits to update the generated and/or refined summary. The edit to be incorporated into the summary may include but is not limited to a text and/or a text-free user utterance. In addition, the text summarization system may update the work order record for the field service call in the database using the updated summary.

Traditional text summarization system suffer from various technological problems and challenges associated with text summarization and refinement. Text summarization may include but is not limited to absorbing the context of a text, be it at least a novel, report, or series of documents, identifying key pieces of information from the text, and/or generating a cohesive narrative based on the extracted information by combining multiple source points together. Some traditional text summarization systems reply on natural language processing (NLP) models to summarize the text data. However, many NLP models struggle with context and ambiguity, leading to misinterpretations due to the rule-based nature of NLP models for extracting and/or combing multiple sources of data.

Implementations described herein solve these technological challenges associated with processing complex text data through the use of a LLM in conjunction with querying the LLM based on a generated textual prompt from a user utterance. The LLM may handle the complex text data since LLMs are trained on vast datasets from diverse text sources. This approach may allow the LLM to adapt to various text styles and formats, and tackle various language tasks without needing specific training for each task. In addition, the use of a LLM may include but is not limited to querying the LLM using a textual prompt generated from a user utterance. In some aspects, using the user utterance to generate textual prompt may be more effective than traditional approaches that the user may need to type in the instructions to steer the LLM. User utterance data, such as voice data, may offer a wealth of information that is simply not available in text data. By considering nonverbal cues, tone of voice, and pauses, the text summarization system can gain a deeper understanding of a behavior of the user. Generating a textual prompt from the user utterance may also help to save time in the field by developing an efficient speech to text conversion for the text summarization system. In particular, the text summarization system using user utterance data may be more effective and efficient in handling complex instructions to query the LLM if the instruction may focus on particular and/or different parts of the summary.

In order to take further advantage of the differences in generating a textual post-work summary for service field calls, aspects of the present disclosure further provide mechanisms for generating a textual prompt-using a prompt template selected from the work order and then incorporating the user utterance, and/or other user data into the selected prompt template. This can allow the text summarization system to adaptively select the appropriate prompt templates designed a specific work order (e.g., task) and further refine the prompt template using user utterance, other user data, any grounding data, and/or any other data extensions retrieved from the database and/or any external data source. In some aspects, the LLM may include multi-modal support, being capable of receiving in a prompt and/or outputting one or more images, audio, and/or video. These and other aspects of the present disclosure will be described in further detail below with respect to the accompanying drawings.

FIG. 1 is a block diagram of text summarization system 100, according to aspects of the present disclosure. In some aspects, the text summarization system 100 may include but is not limited to a data processing module 120, a summarization module 130, a summary refinement module 140, a LLM gateway 150, a summary update module 160, and/or a database 170. Data processing module 120 may include one or more processors, buffers, servers, routers, modems, antennae, and/or circuitry configured to interface with summarization module 130. Summarization module 130 may include one or more processors, buffers, servers, routers, modems, antennae, and/or circuitry configured to interface with data processing module 120, summary refinement module 140, LLM gateway 150, and/or summary update module 160. Summary refinement module 140 may include one or more processors, buffers, servers, routers, modems, antennae, and/or circuitry configured to interface with summarization module 130, LLM gateway 150, and/or summary update module 160. Summary update module 160 may include one or more processors, buffers, servers, routers, modems, antennae, and/or circuitry configured to interface with summarization module 130, summary refinement module 140, and/or database 170.

In some aspects, data source 110 may be a separate computing platform including but not limited to smartphones, tablet computers, laptop computers, desktop computers, web browsers, and/or other computing devices, apparatuses, systems, or platforms. In some aspects, data source 110 may transmit information to text summarization system 100 either in a wired or wireless manner and may be, for example, the Internet, a Local Area Network, or a Wide Area Network. The transmission may utilize a network protocol, such as, for example, a hypertext transfer protocol (HTTP), a TCP/IP protocol, Ethernet, or an asynchronous transfer mode.

In some aspects, text summarization system 100 may receive data from data source 110. The data from data source 110 may include user utterance data, user prompt data, and/or other user data (e.g., a work order and/or work order identifier of the user). The user utterance data may refer to any information or message conveyed in phrases that a user would use to describe what they want to do including but not limited to in the form of text, speech, and/or voice. The user utterances may include but is not limited to commands to more complex sentences, paragraphs, and/or questions. The user prompt data, received from a prompt builder of data source 110, may include but not limited to definition of custom summarization logic for an object by creating a custom summarization prompt template bound to that object. The user prompt data may support the ability to define additional attributes per template, allowing text summarization system 100 to differentiate between templates in a more accurate way using attributes including user profile, and context.

After text summarization system 100 receives the data from data source 110, data processing module 120 may be triggered by the data characteristics that matches predefined criteria in data processing module 120. These criteria may be determined based on a list of factors including but not limited to types of data input, the system capabilities, the computational resource, and/or any transmission effects. Data processing module 120 may then process the data from data source 110 based on the criteria. The data processing may include but is not limited to data preprocessing, data converting (e.g., from speech data to text data), and/or data embedding.

After the data from data source 110 is processed at data processing module 120, data processing module 120 may transmit the processed data to a summarization module 130. The processed data may include but is not limited to a work order of a user and/or other user data and/or metadata. Summarization module 130 may also receive user prompt data directly from the prompt builder of data source 110 to build custom summarization prompt templates for different work orders. Summarization module 130 may generate a natural-language textual prompt based on a textual transcription of a speech of a user (user utterance data) and a custom summarization prompt template built for the work order. Summarization module 130 may then query one or more LLMs across the internet for a response via a LLM gateway 150. LLM gateway 150 may act as a critical intermediary, channeling requests to the LLM service and handling responses. LLM gateway 150 may perform essential post-processing, enhancing the utility and effectiveness of the LLM interactions for safe and responsible use. LLM gateway 150 may also extend to performing critical post-processing tasks, adding significant value and functionality to the LLM service's output. The response from the LLM via LLM gateway 150 may include but is not limited to a textual post-work summary that summarizes work performed by the user. In some aspects, the one or more LLMs may be trained and/or fine-tuned via LLM gateway 150 to adapt the LLMs to specific tasks and datasets. By fine-tuning a pre-trained LLM via LLM gateway 150, text summarization system 100 can customize the LLM to better understand these unique aspects and generate content specific to a domain. This approach allows text summarization system 100 to tailor the LLM's response to align with a specific requirement, ensuring that the LLM can produce accurate and contextually relevant outputs and responses.

After receiving the response from the LLM via LLM gateway 150, summarization module 130 may receive notification from the user that whether refinements are required for the generated textual post-work summary. The user notification may be included in the user data from data source 110.

In some aspects, if the user identifies that further refinements may be needed, summarization module 130 may transmit the LLM response (e.g., textual post-work summary) to a summary refinement module 140. Summary refinement module 140 may generate a natural-language textual prompt for summary refinement based on a textual transcription of a speech of the user (e.g., instructions to refine the summary) and a refinement prompt template. Summary refinement module 140 may then query one or more LLMs across the internet for a response via a LLM gateway 150. The response from the LLM via LLM gateway 150 may include but is not limited to a refined textual post-work summary. The LLMs may be called multiple times to keep refining textual post-work summary until the user is satisfied with the response. Summary refinement module 140 may then transmit the LLM response (e.g., refined textual post-work summary) to a summary update module 160. In some aspects, if the user identifies that no further refinements may be needed for the generated textual post-work summary at summarization module 130, summarization module 130 may directly transmit the textual post-work summary to summary update module 160.

After receiving the textual post-work summary from summary refinement module 140 and/or summarization module 130, summary update module 160 may receive a user instruction on whether one or more edits are required to the generated and/or refined textual post-work summary. The user instruction may be part of the user utterance data from data source 110.

In some aspects, if the user identifies further edits may be needed, summary update module 160 may incorporate the textual transcription of the user instruction into the generated and/or refined textual post-work summary from summarization module 130 and/or summary refinement module 140 to generate an updated textual post-work summary. In some aspects, if the user identifies that no further refinements may be needed for the generated and/or refined textual post-work summary, summary update module 160 may retain the generated and/or refined textual post-work summary.

Summary update module 160 may then receive a user confirmation that may indicate whether the user want to update the work order in database 170. In some aspects, if the user confirms to update the work order, summary update module 160 may then update the work order in database 170 using the generated and/or refined textual post-work summary from summarization module 130 and/or summary refinement module 140.

Figure 2:
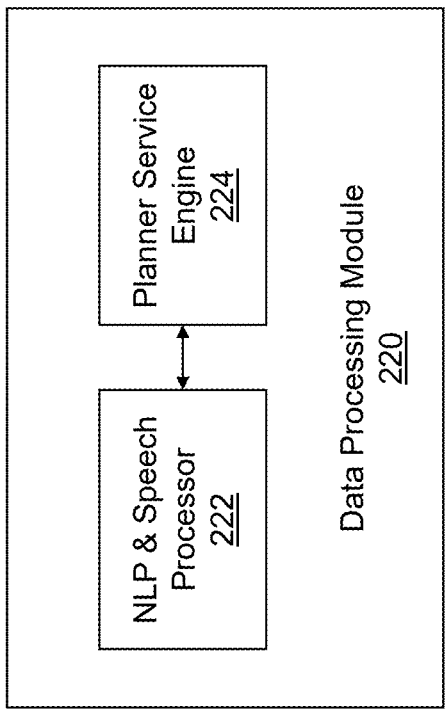
FIG. 2 is a block diagram of a data processing module, according to aspects of the present disclosure.

FIG. 2 is a block diagram of data processing module 220, according to aspects of the present disclosure. In some aspects, data processing module 220 may include but is not limited to a NLP and speech processor 222, and/or a planner service engine 224. Data processing module 220 shall be described with reference to text summarization system 100 in FIG. 1. However, data processing module 220 is not limited to that example aspect.

When data processing module 220 receives data from data source 110, data processing module 220 may transmit the data to NLP and speech processor 222. The data from data source 110 may include user utterance data, user prompt data, and/or other user data. NLP and speech processor 222 may be configured to generate a textual transcription from the user utterance data, wherein the user utterance data may include but is not limited to the speech of the user. In some aspects, NLP and speech processor 222 may perform a variety of data processing techniques including but not limited to data converting (e.g., from speech data to text data), data processing, and/or data embedding. The data converting performed at NLP and speech processor 222 may transcript speech to text and/or convert text to speech. The data converting may be performed by leveraging at least a NLP technique, a machine learning model, and/or a speech recognition model. For example, a machine learning (e.g., deep learning) model may be trained with voice and/or speech samples and texts to look for the speech patterns. Once the machine learning model may have been trained, it may match the voice and/or speech recording to the appropriate texts. The data converting may convert speech of different languages and/or accents to the texts. The data processing may include but is not limited to speech processing and text processing. The speech processing may include but is not limited to speech enhancement, and/or speech de-noising. The text processing may include but is not limited to text cleaning, tokenization, chunking, stemming, and/or lemmatization. The data embedding may include performing at least one-hot encoding, Bag of Words (BOW), Term Frequency and Inverse document Frequency (TF-IDF), Word2Vec, Skip-Gram, and/or pre-trained word-embedding using embedding layers.

After receiving the textual transcription of the user utterance data from NLP and speech processor 222, planner service engine 224 may generate multiple steps or actions required for summarization module 130. Based on the required input fields of summarization module 130, planner service engine 224 may also identify and/or chain with summarize module 130 to provide required functions, actions, and/or prompt templates. In some aspects, planner service engine 224 may include a function invocation handler that may provide a function that determines at least what to do with a method call, how to perform the action, and/or how to return a result. Planner service engine 224 can also provide a list of names of available actions and corresponding descriptions as context data. In examples, among the list of available actions, the following actions listed from Table 1 to Table 4 can be provided as context data:

TABLE 1

| Actions Metadata-Action Description | |
|---|---|
| Example action name | Example action description |
| Identify Record By Name | Searches for records by name and returns a list of matching record IDs. If an input for a search of user records includes "Tom" and multiple records include "Tom" in the name field, the action can return the user IDs of all users named "Tom". |
| Summarize Record | Summarizes or refines single Work Order record based on user utterance. This action can be specific to Work Order records only. The action Identify Record By Name can be called directly prior to this action to get a single record ID as input. If the record ID returned by Identify Record By Name Action starts with 0 Work Order, can call this action instead of Standard Summarize action. Can always call Update Work Order Summary Action after this action. Can send the output or summary from this action as input to Update Work Order Summary action. |
| Summary Refinement | Summarizes or refines single Work Order record based on user utterance. This summary generation and refinement action can be specific to Work Order records only. For refinement requests, can resolve the Work Order ID from the summary passed in. After executing this action, can always ask if the user wants to save the summary to the Work Order. Can always execute Update Work Order Summary action after this and can send user response as input to it. |
| Update Summary | Updates the Work Order record with generated or refined summary. Always can run this action after Summarize Record or Summary For Work Order actions for records with ids starting with 0 Work Order. Prior to running this action, can ask user confirmation if they want to save or update the work order summary. Can take their response as user Response input of this action. |

TABLE 2

Actions Metadata-Parameters Description for Summarize Record

| Example input parameters | Example input parameters description |
| --- | --- |
| Record Summary | The rich text summary that was created for the specified record by Summarize Record action in the plan. Summarize Record should be executed first before executing this action. |
| User Utterance | The question or request from the user's input. |
| Work Order ID | The ID of the work order record for which the summary needs to be generated. Can call Identify Record By Name Action on the user utterance and Record Summary parameters or the previous utterance in the conversation to resolve the Work Order ID. Work Order ID starts with 0 Work Order. |

| Example output parameters | Example output parameters description |
| --- | --- |
| Summary | The rich text summary that was created for the specified record. This is a refinement of the summary generated using standard action and refinement input from user. After this action, can call standard Summarize Record action and pass in the summary Work Order ID as input for that action. |

TABLE 3

Actions Metadata-Parameters Description for Summary Refinement

| Example input parameters | Example input parameters description |
| --- | --- |
| Record Summary | The rich text summary that was created for the specified record by Summarize Record action in the plan. Summarize Record should be executed first before executing this action. |
| User Utterance | The question or request from the user's input. |
| Work Order ID | The ID of the work order record for which the summary needs to be generated. Can call Identify Record By Name Action on the user utterance and Record Summary parameters or the previous utterance in the conversation to resolve the Work Order ID. Work Order ID starts with 0 Work Order. |

| Example output parameters | Example output parameters description |
| --- | --- |
| Refined Summary | The rich text summary that was created for the specified record. This is a refinement of the summary generated using standard action and refinement input from user. After this action, can call standard Summarize Record action and pass in the summary Work Order ID as input for that action. |

TABLE 4

Actions Metadata-Parameters Description for Update Summary

| Example input parameters | Example input parameters description |
| --- | --- |
| Record Summary | The rich text summary that was created for the specified record. |
| User Response or Save Summary | Response from user indicating if they want the summary to be saved. |
| Work Order ID | The ID of the work order record for which the summary needs to be generated. Can call Identify Record By Name Action on the user utterance and Record Summary |

TABLE 4-continued

Actions Metadata-Parameters Description for Update Summary

| | parameters or the previous utterance in the conversation to resolve the Work Order ID. Work Order ID starts with 0 Work Order. |
| --- | --- |

| Example output parameters | Example output parameters description |
| --- | --- |
| Saved Summary | Shows Work Order ID and the saved summary. |

Figure 3:
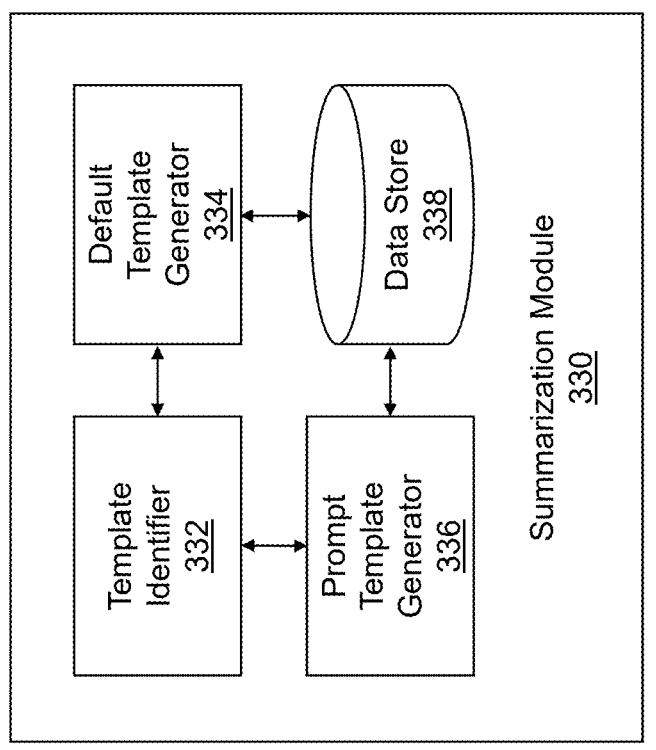
FIG. 3 is a block diagram of a summarization module, according to aspects of the present disclosure.

FIG. 3 is a block diagram of summarization module 330, according to aspects of the present disclosure. In some aspects, summarization module 330 may include but is not limited to a template identifier 332, a default template generator 334, a prompt template generator 336, and/or a data store 338. Summarization module 330 shall be described with reference to text summarization system 100 in FIG. 1. However, summarization module 330 is not limited to that example aspect.

When summarization module 330 receives processed data from data processing module 220 described in FIG. 2, summarization module 330 may transmit the processed data to a template identifier 332. The processed data from data processing module 220 may include the textual transcription of the user utterance data from NLP and speech processor 222, the functions/actions provided by planner service engine 224 for summarization module 330, and/or a work order of the user. Template identifier 332 may be configured to determine whether a custom template exists for the work order. In some aspects, if template identifier 332 identifies that there are no custom templates existed for the work order, template identifier 332 may transmit the processed data to a default template generator 334. Default template generator 334 may generate a default summarization prompt template for the work order of the user. Default template generator 334 may select the default summarization prompt template from a data store 338. Data store 338 may include a default template store, a file-based template store, and a database-based template store. In some aspects, if template identifier 332 identifies that there are custom templates existed for the work order, template identifier 332 may transmit the processed data to a prompt template generator 336. Prompt template generator 336 may generate a custom summarization prompt template for the work order of the user. Prompt template generator 336 may select the custom summarization prompt template from data store 338.

Figure 4:
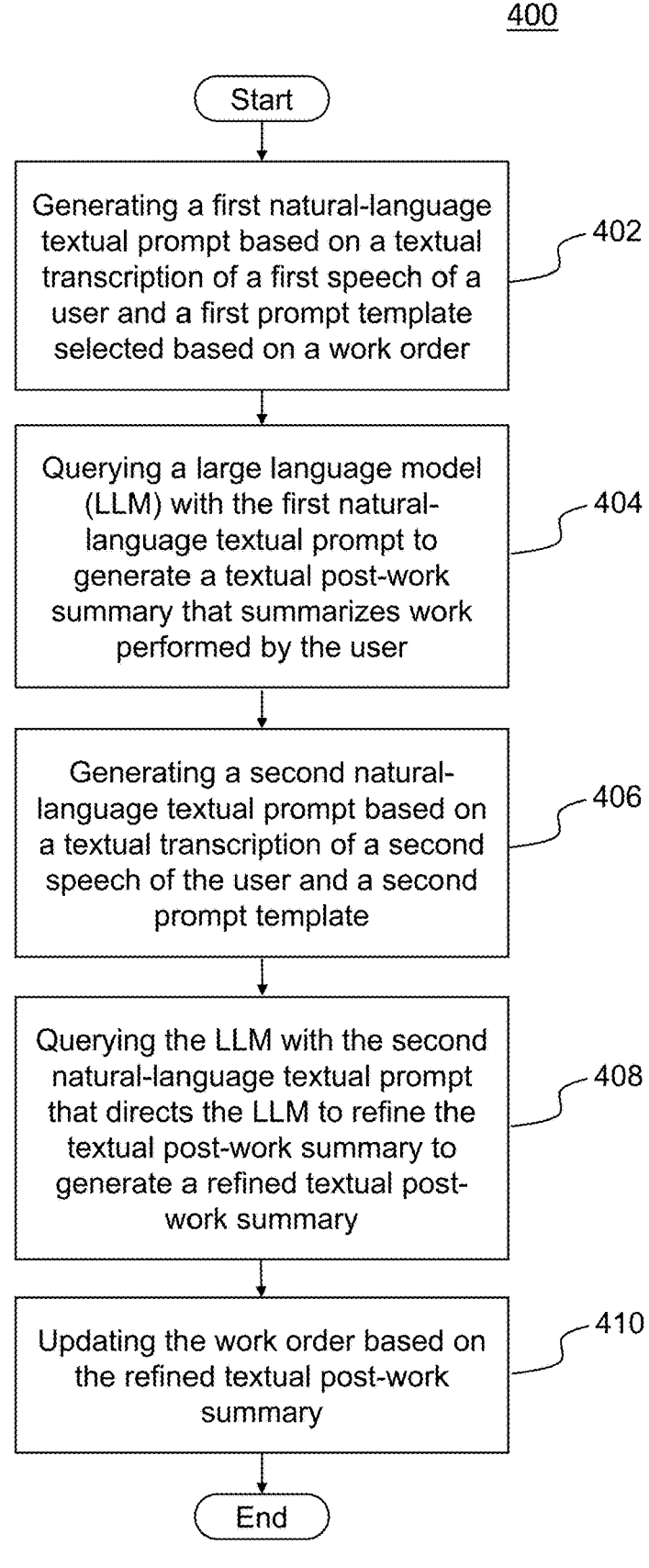
FIG. 4 is a flowchart illustrating a method for textual post-work summary generation, refinement, and/or update, according to aspects of the present disclosure.

FIG. 4 is a flowchart illustrating a method 400 for textual post-work summary generation, refinement, and/or update, according to aspects of the present disclosure. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIG. 1, FIG. 2, and FIG. 3. However, method 400 is not limited to that example aspect. In 402, a first natural-language textual prompt may be generated based on a textual transcription of a first speech of a user and a first prompt template selected based on a work order.

In some aspects, summarization module 130 may perform a standard summarize action. This standard summarize action may provide a way to plug in custom prompt templates from the user for customization depending on the work orders being summarized. The custom prompt templates may include file-based out-of-the-box templates and database-based templates. For example, the file-based templates can be shipped and assigned to an entity for summarization. The database-based templates may support customizable prompt templates. As for template precedence, database-based templates may be prioritized over file-based templates, from the assumption that a customized template may be more specific to the business logic of the customer over the file-based template. For numerous database-based templates, summarization module 130 may choose the one with the most recent version. For numerous file-based templates, summarization module 130 may choose the first template on the list but may retain the last as the internal template. Summarization module 130 may also receive user prompt data from the prompt builder of data source 110 to support the ability to define additional attributes per template. The prompt builder may allow the standard summarize action to differentiate between templates in a more accurate way using attributes including but not limited to user profile, and context. The standard summarize action performed at summarization module 130 may support different summaries for the same entity based on different field values of the work orders. For example, the filed values may be assigned different between a new business fields and the existing business. The standard summarize action may filter prompt templates based on user profile and/or other user contexts. If there are no custom prompt templates provided by summarization module 130, the standard summarize action may use a default and/or generic summarization prompt template. In some aspects, the standard summarize action performed at summarization module 130 may support refinement of the summary when refinement instructions are given in different user utterances.

In some aspects, summarization module 130 may perform a custom summarization action. The custom summarization action may be chained over any follow up and subsequent actions including but not limited to refinement, update, and/or save of the summary. Summarization module 130 may reuse standard summarize action within the custom summarization action to support at least the selection of the custom prompt template or other built-in features associated with the custom summarization action. The custom summarization action may support silent save, if summarization module 130 needs to save summary to the record or call any other functionality on an execution of the action. The custom summarization action may also support more consistent action chaining with an update action to save generated summary to the work order record.

FIG. 5 is a flow example illustrating a post-work summary flow with standard summarize action 500, according to aspects of the present disclosure. FIG. 5 shall be described with reference to FIG. 1, FIG. 2, FIG. 3, and FIG. 4. In one aspect, text summarization system 100 may separate the standard summarize action 502 and/or the summary refinement action 504. If the user likes to refine generated summary, standard summarize action 502 may be chained with the summary refinement action 504. Summary refinement action 504 may be chained with itself for one or more times due to multiple refinements. If the user identifies no refinements are required, standard summarize action 502 may be chained with saving check action 506. Saving check action 506 may then be chained with the update action 508.

Figure 6:
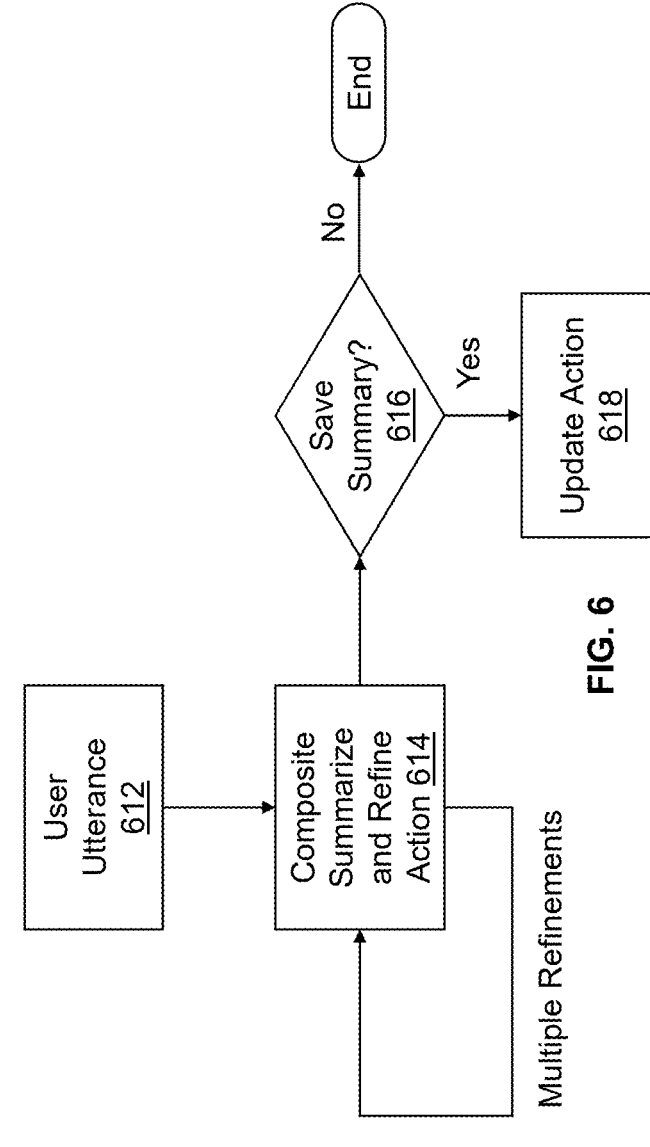
FIG. 6 is a post-work summary flow without standard summarize action, according to aspects of the present disclosure.

FIG. 6 is a flow example illustrating a post-work summary flow without standard summarize action 600, according to aspects of the present disclosure. FIG. 6 shall be described with reference to FIG. 1, FIG. 2, FIG. 3, and FIG. 4. In one aspect, text summarization system 100 may include but is not limited to a composite summarize and refine action 614. Text summarization system 100 may receive user utterance 612. User utterance 612 may be chained by composite summarize and refine action 614 during the processing. Composite summarize and refine action 614 may be chained with itself for one or more times of due to multiple refinements. Composite summarize and refine action 614 may be chained with a saving check action 616. Saving check action 616 may then be chained with the update action 618.

The following example code listed in Listing 1 may provide an Apex Invocable Method for Summarize Record action, according to some aspects.

---

Listing 1. Apex Invocable Method for Summarize Record Action

```
public with sharing class FSLSummaryRefinement {
    @InvocableMethod(label='FSL Summary Refinement' description='Returns a summary or
refined summary if additional refinement instruction are included in the user utterance, for a
work order. For records of type Work Order, this action should be chosen over the standard
summarize action')
    public static List<String> refineSummaryForWorkOrder(List<Input> input) {
        List<String> output = new List<String>( );
        for(Integer i=0; i<input.size( ); i++)
        {
            output.add(input.get(i).recordSummary + ' ' + input.get(i).userUtterance + '
WorkOrderId:' + input.get(i).workOrderId);
        }
        return output;
    }
        public class Input {
            @InvocableVariable(label='workOrderId' description='The Id of the work order for which
the summary needs to be generated' required=true)
            public Id workOrderId;
            @InvocableVariable(label='recordSummary' description='The rich text summary that was
created for the specified record by SummarizeRecord copilot action in the plan.
SummarizeRecord should be executed first before executing this action' required=false)
            public String recordSummary;
```

-continued

---

Listing 1. Apex Invocable Method for Summarize Record Action

---

```
        @InvocableVariable(label='userUtterance' description='The question or request from the
user's input.' required=false)
            public String userUtterance;
        }
    }
```

---

Referring back to FIG. 4, in 404, a LLM may be queried with the first natural-language textual prompt to generate a textual post-work summary that summarizes work performed by the user. In some aspects, one or more LLMs may be queried via a LLM gateway 150. The response from the LLM via LLM gateway 150 may include but is not limited to a textual post-work summary.

In 406, a second natural-language textual prompt may be generated based on a textual transcription of a second speech of the user and a second prompt template. In some aspects, summary refinement module 140 may build a summary refinement action to generate a refinement prompt template. The summary refinement action may handle the use case of both summarization request and refinement information being present in the same user utterance. The summary refinement action may perform action chaining with summarization action to generate a summary to be refined. The summary refinement action may also define follow up actions at action level to update and/or edit the summary and/or the refined summary. Based on the required input fields, the planner service engine 224 described in FIG. 2 may identify and chain with the summarize action.

In some aspects, the summary refinement action may include querying the LLM in the action. Querying the LLM may use a prompt template defined for summary refinement. The prompt service including template generator of summary refinement module 140 may build the textual prompt template. The textual prompt template may be built into the summary refinement action, providing more flexibility in adding at least grounding data and/or or any other extensions. Summary refinement module 140 may call LLM via LLM gateway 150 to generate a refined textual post-work summary. The refined textual post-work summary may include but is not limited to a work order and/or a work order identifier.

In some aspects, the summary refinement action may include wrapping a prompt template to generate a refinement prompt template in the summary refinement action. For example, the prompt template may be wrapped by taking two text values as input, making the refinement prompt template easy to build.

The following example code listed in Listing 2 may provide an Apex Invocable Method for Summary Refinement action, according to some aspects.

---

Listing 2. Apex Invocable Method for Summary Refinement Action

---

```
public with sharing class FSLSummaryRefinement {
    @InvocableMethod(label='FSL Summary Refinement' description='Returns a summary or
refined summary if additional refinement instruction are included in the user utterance, for a
work order. For records of type Work Order, this action should be chosen over the standard
summarize action')
    public static List<String> refineSummaryForWorkOrder(List<Input> input) {
        List<String> output = new List<String>( );
        for(Integer i=0; i<input.size( ); i++)
        {
            output.add(input.get(i).recordSummary + ' ' + input.get(i).userUtterance + '
WorkOrderId:' + input.get(i).workOrderId);
            }
        return output;
    }
    public class Input {
        @InvocableVariable(label='workOrderId' description='The Id of the work order for which
the summary needs to be generated' required=true)
            public Id workOrderId;
            @InvocableVariable(label='recordSummary' description='The rich text summary that was
created for the specified record by SummarizeRecord copilot action in the plan.
SummarizeRecord should be executed first before executing this action' required=true)
            public String recordSummary;
            @InvocableVariable(label='userUtterance' description='The question or request from the
user's input.' required=true)
            public String userUtterance;
        }
    }
```

---

In 408, the LLM may be queried with the second natural-language textual prompt that directs the LLM to refine the textual post-work summary to generate a refined textual post-work summary. In some aspects, one or more LLMs may be queried via LLM gateway 150. The response from the LLM via LLM gateway 150 may include but is not limited to a refined textual post-work summary.

In 410, the work order may be updated based on the refined textual post-work summary. User confirmation may be obtained before the work order is updated with the generated textual post-work summary and/or the refined textual post-work summary. In some aspects, the summary update module 160 may get user confirmation through a follow up action. This follow up action may be rendered as buttons under individual messages. Specific user interface to the follow up action may also be defined including defining action buttons and/or different designs of the user interface.

Figure 7:
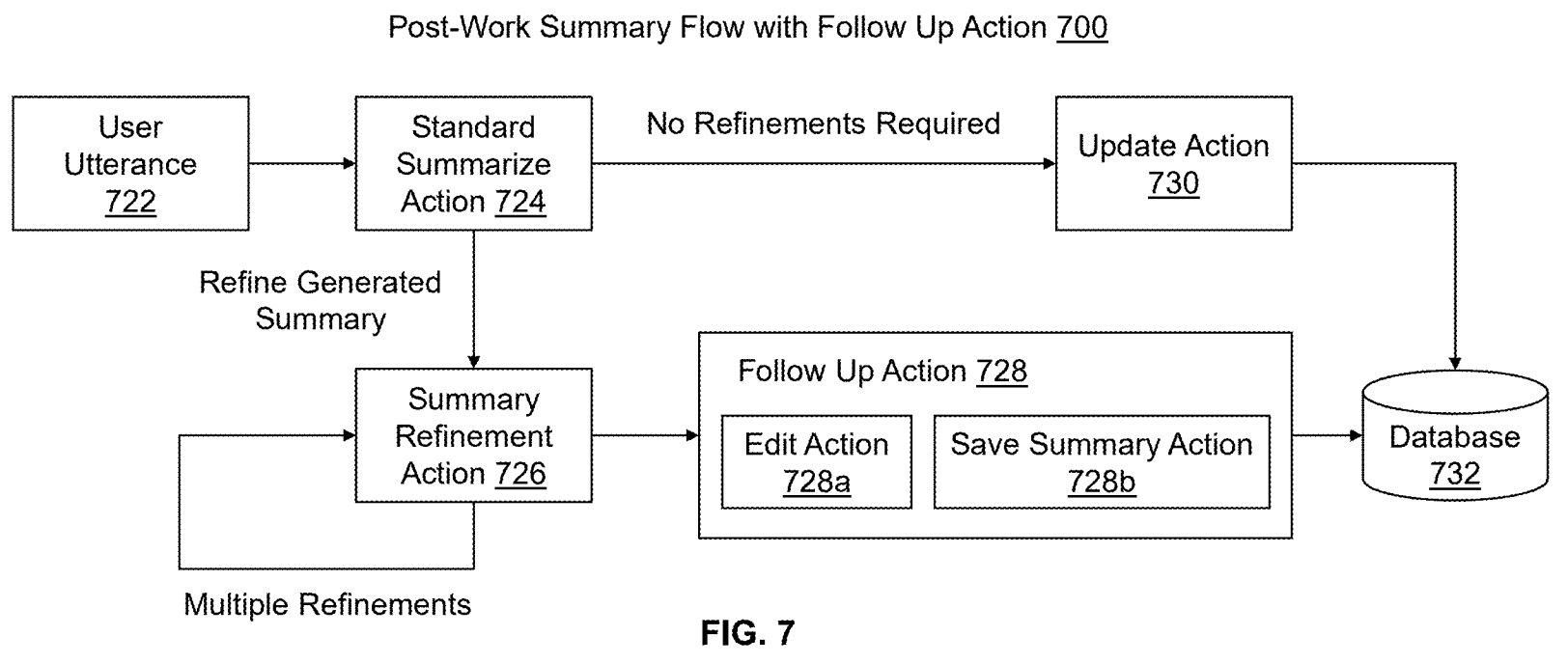

FIG. 7 is a flow example illustrating a post-work summary flow with follow up action 700, according to aspects of the present disclosure. FIG. 7 shall be described with reference to FIG. 1, FIG. 2, FIG. 3, and FIG. 4. In one aspect, follow up action 726 may be embedded into the post-work summary flow 700. For example, if the user likes to refine generated summary, text summarization system 100 may receive user utterance 722. User utterance 722 may be chained by standard summarize action 724 during the processing. Standard summarize action 724 may be chained with the summary refinement action 726. Summary refinement action 726 may be chained with itself for one or more times due to multiple refinements. Summary refinement action 726 may then be chained with follow up action 728 before the summary is updated into database 732. The follow up action 728 may include but is not limited to an edit action 728*a* and/or a summary save action 728*b*. If the user identifies no refinements are required, standard summarize action 724 may directly be chained with an update action 730 before the summary is updated into database 732.

In some aspects, user confirmation may be obtained within the flow with action chaining. A summary update action may be generated and the LLM may be instructed, via LLM gateway 150, to ask for user confirmation before the summary update action is executed. The summary update action may be performed when the user is satisfied with the summary generated by the standard summarize action and identify that the summary refinement action is not needed.

Figure 8:
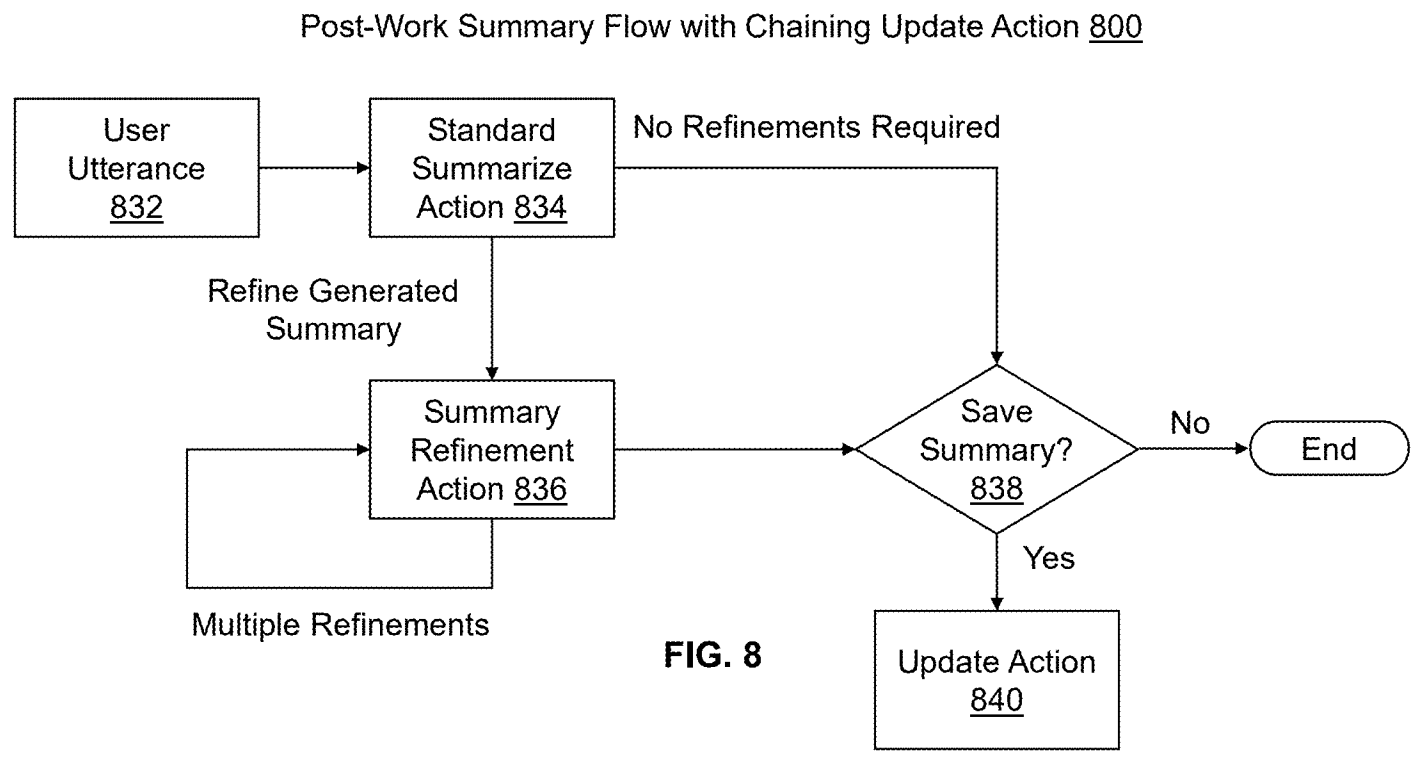

FIG. 8 is a flow example illustrating a post-work summary flow with chaining update action 800, according to aspects of the present disclosure. FIG. 8 shall be described with reference to FIG. 1, FIG. 2, FIG. 3, and FIG. 4. An update action chaining flow may be embedded into the post-work summary flow 800. The update action chaining flow may include but are not limited to user utterance 832→standard summarize action 834→user confirmation to save 838→update summary action 840, and/or user utterance 832→standard summarize action 834→summary refinement action 836→user confirmation to save 838→update summary action 840. User confirmation to save 838 in the flows may be identified by another user utterance 832 that may include the saving instruction from the user.

In some aspects, user confirmation may be obtained with silent save. The summary may be silently saved every time the refine summary action is run. For example, both summarize action and summary refinement action may be combined and/or chained together to save the record in a silent manner.

FIG. 9 is a flow example illustrating the post-work summary flow with salient save action 900, according to aspects of the present disclosure. FIG. 9 shall be described with reference to FIG. 1, FIG. 2, FIG. 3, and FIG. 4. A salient save action flow may be embedded into the post-work summary flow 900. The salient save flow may include a composite action 944. User utterance 942 may be chained by composite action 944. Composite action 944 may include but is not limited to a summarize action 944*a*, a refine action 944*b*, and/or a silent save action 944*c*. Composite action 944 may be chained with itself for one or more times of due to multiple refinements. The summary after silent save action 944*c* may be updated into database 946.

The following example code listed in Listing 3 may provide an Apex Invocable Method for Update Summary action, according to some aspects.

---

Listing 3. Apex Invocable Method for Update Summary Action

---

```
public with sharing class FSLUpdateSummary {
    @InvocableMethod(label='FSL Update Summary' description='Updates the Work Order
record with generated or refined summary.')
    public static List<String> fslUpdateSummary(List<Input> input) {
        List<String> output = new List<String>( );
        for(Integer i=0; i<input.size( ); i++)
        {
            String woId = input.get(i).workOrderId;
            output.add(input.get(i).recordSummary);
            List<WorkOrder> workOrdersToUpdate = [SELECT Id, Post WorkSummary__c FROM
WorkOrder WHERE Id = :woID];
            workOrdersToUpdate.get(0).PostWorkSummary__c = input.get(i).recordSummary;
            update workOrdersToUpdate;
        }
        return output;
    }
    public class Input {
        @InvocableVariable(label='workOrderId' description='The Id of the work order for which
the summary need to updated or saved' required=true)
        public Id workOrderId;
        @InvocableVariable(label='recordSummary' description='The rich text summary that was
created for the specified record.' required=true)
```

-continued

---

Listing 3. Apex Invocable Method for Update Summary Action

---

```
        public String recordSummary;
        @InvocableVariable(label='userResponse' description='Response from user indicating if
they want the summary to be saved.' required=true)
        public Boolean saveSummary;
    }
}
```

---

In addition, an updated textual post-work summary may be generated based on incorporating a textual transcription of a third speech of the user into the refined textual post-work summary. In some aspects, summary update module 160 may provide user an ability to edit the summary generated and/or refined before the summary is saved into a database 170. Summary update module 160 may then update the work order based on the updated textual post-work summary. There are a few ways the user interface of summary edit can be shown in the update action, including showing an editable box in panel of the follow up action. Once the box in the panel is clicked, the work order record may be opened in the user interface with the generated and/or refined summary being copied over. User can then edit and save the work order into record via the user interface.

Figure 10:
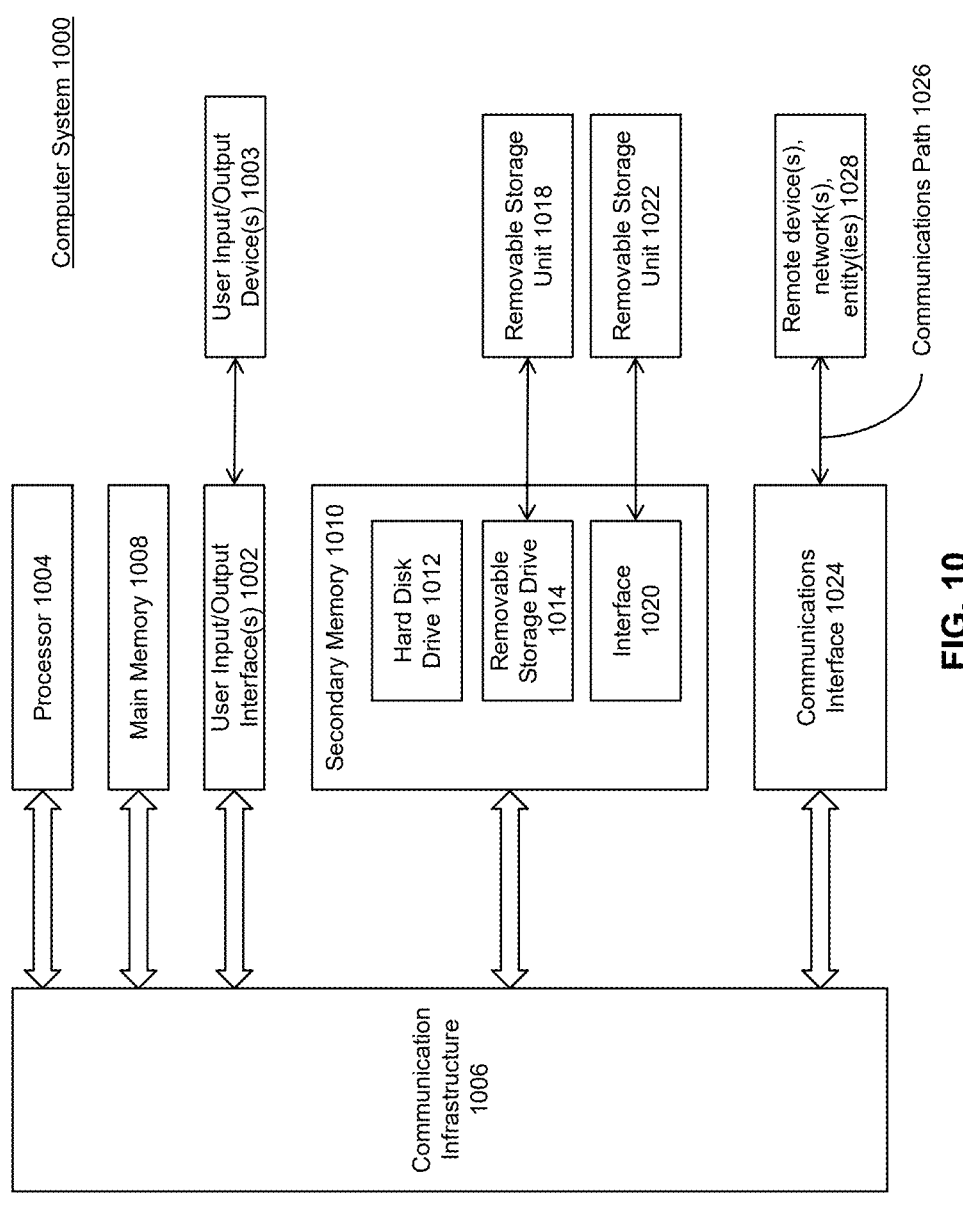
FIG. 10 illustrates an example computer system useful for implementing various aspects of the present disclosure.

Various aspects may be implemented, for example, using one or more well-known computer systems, such as computer system 1000 shown in FIG. 10. For example, aspects herein using the text summarization system may be implemented using combinations or sub-combinations of computer system 1000. Also or alternatively, one or more computer systems 1000 may be used, for example, to implement any of the aspects discussed herein, as well as combinations and sub-combinations thereof. A "module," as the term is used herein, is a computational element that performs one or more functions according to computer readable instructions stored on one or more memories or other non-transitory computer-readable media.

Computer system 1000 may include one or more processors (also called central processing units, or CPUs), such as a processor 1004. Processor 1004 may be connected to a communication infrastructure or bus 1006.

Computer system 1000 may also include user input/output device(s) 1003, such as monitors, keyboards, pointing devices, etc., which may communicate with communication infrastructure 1006 through user input/output interface(s) 1002.

One or more of processors 1004 may be a graphics processing unit (GPU). In an aspect, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some aspects, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000 or processor(s) 1004), may cause such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 10. In particular, aspects can operate with software, hardware, and/or operating system implementations other than those described herein.

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary aspects, but should be defined only in accordance with the following claims and their equivalents.

What is claimed is:

1. A method, comprising:

generating, by one or more computing devices, a first natural-language textual prompt based on a textual transcription of a first speech of a user and a first prompt template selected based on a work order;

querying, by the one or more computing devices, a large language model (LLM) with the first natural-language textual prompt to generate a first textual post-work summary that summarizes work performed by the user;

generating, by the one or more computing devices, a second natural-language textual prompt based on a textual transcription of a second speech of the user and a second prompt template;

querying, by the one or more computing devices, the LLM with the second natural-language textual prompt that directs the LLM to refine the first textual post-work summary to generate a refined first textual post-work summary;

in response to the refined first textual post-work summary not being confirmed by the user to update the work order, querying, by the one or more computing devices, the LLM with a third natural-language textual prompt that directs the LLM, in a composite manner, to generate a second textual post-work summary and refine the second textual post-work summary, wherein the third natural-language textual prompt combines the first natural-language textual prompt and the second natural-language textual prompt; and updating, by the one or more computing devices, the work order based on a refined second textual post-work summary.

2. The method according to claim 1, further comprising:

determining whether a database contains a custom prompt template associated with the work order;

selecting from the database, as the first prompt template, the custom prompt template, based on the database containing the custom prompt template, or a default prompt template, based on the database not containing the custom prompt template.

3. The method according to claim 2, wherein the first prompt template comprises a latest custom prompt template of a plurality of custom prompt templates associated with the work order in the database.

4. The method according to claim 1, further comprising:

generating an updated textual post-work summary based on incorporating a textual transcription of a third speech of the user into the refined second textual post-work summary, wherein the textual transcription comprises one or more edits from the user; and updating the work order based on the updated textual post-work summary.

5. The method according to claim 4, further comprising receiving a second user confirmation to use the updated textual post-work summary to update the work order.

6. The method according to claim 1, wherein the second prompt template comprises a default prompt template.

7. The method according to claim 1, further comprising receiving a first user confirmation to use the refined second textual post-work summary to update the work order.

8. A system, comprising:

a memory configured to store operations; and one or more processors configured to perform the operations, the operations comprising:

generating a first natural-language textual prompt based on a textual transcription of a first speech of a user and a first prompt template selected based on a work order;

querying a large language model (LLM) with the first natural-language textual prompt to generate a first textual post-work summary that summarizes work performed by the user;

generating a second natural-language textual prompt based on a textual transcription of a second speech of the user and a second prompt template;

querying the LLM with the second natural-language textual prompt that directs the LLM to refine the first textual post-work summary to generate a refined first textual post-work summary;

in response to the refined first textual post-work summary not being confirmed by the user to update the work order, querying the LLM with a third natural-language textual prompt that directs the LLM, in a composite manner, to generate a second textual post-work summary and refine the second textual post-work summary, wherein the third natural-language textual prompt combines the first natural-language textual prompt and the second natural-language textual prompt; and updating the work order based on a refined second textual post-work summary.

9. The system according to claim 8, wherein the one or more processors are further configured to perform operations comprising:

determining whether a database contains a custom prompt template associated with the work order;

selecting from the database, as the first prompt template, the custom prompt template, based on the database containing the custom prompt template, or a default prompt template, based on the database not containing the custom prompt template.

10. The system according to claim 9, wherein the first prompt template comprises a latest custom prompt template of a plurality of custom prompt templates associated with the work order in the database.

11. The system according to claim 8, wherein the one or more processors are further configured to perform operations comprising:

generating an updated textual post-work summary based on incorporating a textual transcription of a third speech of the user into the refined second textual post-work summary, wherein the textual transcription comprises one or more edits from the user; and updating the work order based on the updated textual post-work summary.

12. The system according to claim 11, wherein the one or more processors are further configured to perform operations comprising receiving a second user confirmation to use the updated textual post-work summary to update the work order.

13. The system according to claim 8, wherein the second prompt template comprises a default prompt template.

14. The system according to claim 8, wherein the one or more processors are further configured to perform operations comprising receiving a first user confirmation to use the refined second textual post-work summary to update the work order.

15. A non-transitory computer-readable storage device having instructions stored thereon, execution of which, by one or more processing devices, causes one or more processors to perform operations comprising:

generating a first natural-language textual prompt based on a textual transcription of a first speech of a user and a first prompt template selected based on a work order;

querying a large language model (LLM) with the first natural-language textual prompt to generate a first textual post-work summary that summarizes work performed by the user;

generating a second natural-language textual prompt based on a textual transcription of a second speech of the user and a second prompt template;

querying the LLM with the second natural-language textual prompt that directs the LLM to refine the first textual post-work summary to generate a refined first textual post-work summary;

in response to the refined first textual post-work summary not being confirmed by the user to update the work order, querying the LLM with a third natural-language textual prompt that directs the LLM, in a composite manner, to generate a second textual post-work summary and refine the second textual post-work summary, wherein the third natural-language textual prompt combines the first natural-language textual prompt and the second natural-language textual prompt; and updating the work order based on a refined second textual post-work summary.

16. The non-transitory computer-readable storage device according to claim 15, wherein the operations further comprise:

determining whether a database contains a custom prompt template associated with the work order;

selecting from the database, as the first prompt template, the custom prompt template, based on the database containing the custom prompt template, or a default prompt template, based on the database not containing the custom prompt template.

17. The non-transitory computer-readable storage device according to claim 16, wherein the first prompt template comprises a latest custom prompt template of a plurality of custom prompt templates associated with the work order in the database.

18. The non-transitory computer-readable storage device according to claim 15, wherein the operations further comprise:

generating an updated textual post-work summary based on incorporating a textual transcription of a third speech of the user into the refined second textual post-work summary, wherein the textual transcription comprises one or more edits from the user;

receiving a user confirmation to use the updated textual
post-work summary to update the work order; and updating the work order based on the updated textual
post-work summary.

19. The non-transitory computer-readable storage device
according to claim 15, wherein the second prompt template
comprises a default prompt template.

20. The non-transitory computer-readable storage device
according to claim 15, wherein the operations further comprise receiving a user confirmation to use the refined second
textual post-work summary to update the work order.

*     *     *     *     *